A. LEONARD.
Cultivators.

No. 137,782. Patented April 15, 1873.

Witnesses;
W. Carlin Clark.
H. E. Matthews.

Inventor.
Augustus Leonard
by Dyer, Beadle & Co
Attys.

UNITED STATES PATENT OFFICE.

AUGUSTUS LEONARD, OF NEWELL'S RUN, OHIO.

IMPROVEMENT IN CULTIVATORS.

Specification forming part of Letters Patent No. 137,782, dated April 15, 1873; application filed August 30, 1872.

*To all whom it may concern:*

Be it known that I, AUGUSTUS LEONARD, of Newell's Run, in the county of Washington and State of Ohio, have invented a new and useful Improvement in Potato-Plow; and I do hereby declare that the following is a full, clear, and exact description of the same, reference being had to the accompanying drawing and to the letters of reference marked thereon.

This invention relates to that class of cultivators which are provided with a pair of elastic side beam rigidly secured in front to a central beam, the side beam being adjustable laterally by means of the handles, as shown in my patent of August 23, 1870; and consists mainly in the manner of connecting the handles to the side beams, as will be fully described hereinafter.

Figure 1:
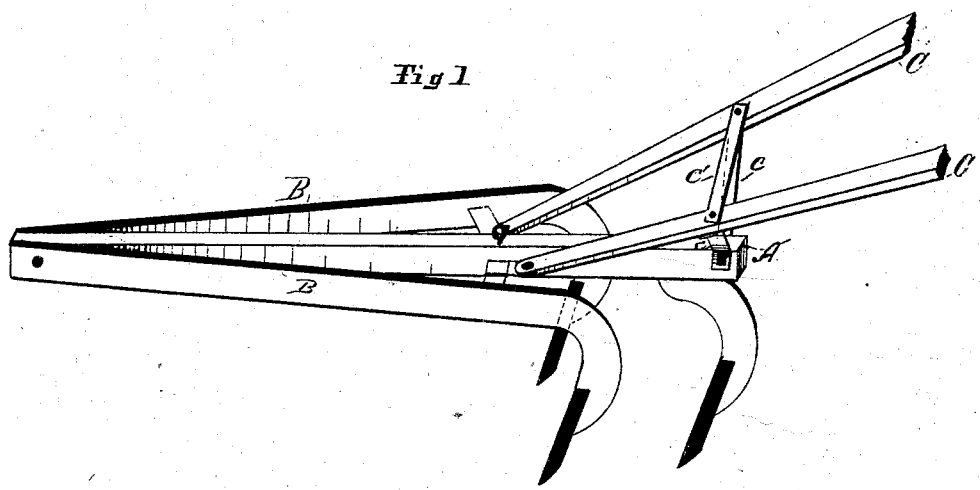
Figure 2:
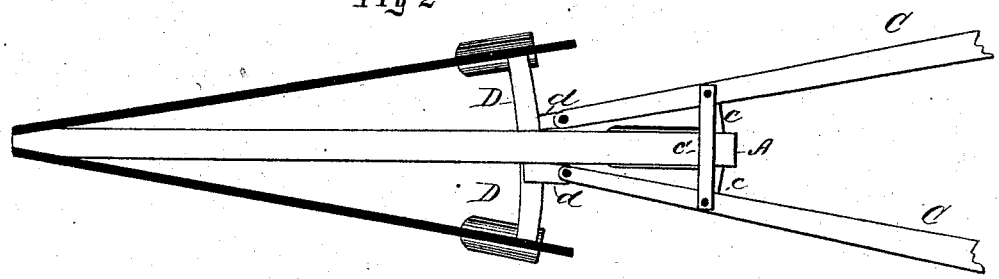
Figure 3:
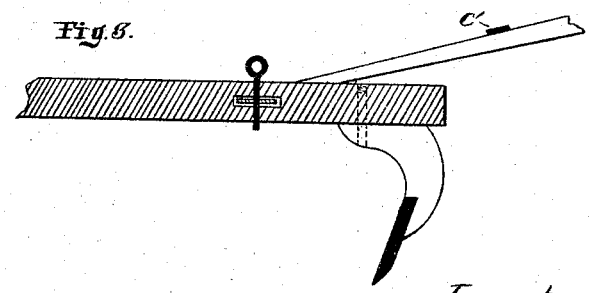

In the drawing, Figure 1 represents a view in perspective of my improved plow, Fig. 2 a plan view, and Fig. 3 an elevation, partially in section.

To enable others skilled in the art to make and use my invention, I will now proceed to describe fully its construction and operation.

A represents the central beam, made of any suitable size and proper material, to which are attached in any proper manner, at its front end, the elastic side beams B B, preferably made of metal. The front end of the central beam has its sides beveled toward the center, so that the side beams which are attached at that point diverge from the center line as they extend rearward, as clearly shown in the drawing. $c\ c$ represent outwardly-inclined standards rising from the center beam, to the upper ends of which the handles C C are pivoted, as shown. $c'$ represents a tie-bar uniting the upper ends of the pivots of the handles, by means of which proper strength is secured. D D represent bars of any suitable material, the outer ends of which are rigidly secured to the side beams, as shown, the inner ends extending through a slot in the central beam, and provided with an arm, $d$, by means of which they are connected to the front ends of the handles, as shown. These bars are provided with suitable holes, which correspond with the side beams, and in certain positions with an opening in the center beam, so that the bars may be rigidly held in certain fixed positions by means of a securing-pin, as shown. The side beams are provided with shovels, as shown, as is also the center beam. The standard of the latter beam is made removable, by which means the machine is made capable of use for cultivating small corn.

The operation of my plan will be readily understood. It is used generally in the same manner that other implements of this class are used. When it is desired to change the position of the side beams the rear ends of the handles are drawn together or separated from each other, by which means the side beams through the medium of the sliding bars D D are correspondingly moved.

The side beams may be held in any desired position by means of the securing-pin.

Having thus fully described my invention what I claim as new, and desire to secure by Letters Patent, is—

1. The combination of the central beam, the side beams, the sliding bars, and the pivoted handles, the handles being connected to the sliding bars at their front ends, substantially as described.

2. The machine described, consisting of the central beam A and the side beams B, united thereto as described, the handles C C, standards $c\ c$, tie-bars $c'$, sliding bars D D, with holes, as described, and the securing-pin in the central beam, as set forth.

This specification signed and witnessed this 16th day of August, 1872.

AUGUSTUS LEONARD.

Witnesses:
 RICHARD ROE,
 E. A. JONES.